US007961997B2

(12) United States Patent
Cho et al.

(10) Patent No.: US 7,961,997 B2
(45) Date of Patent: *Jun. 14, 2011

(54) SPACE DIVERSITY OPTICAL RECEIVER AND SYSTEM AND METHOD USING THE SAME

(75) Inventors: Pak Shing Cho, Gaithersburg, MD (US); Jacob Khurgin, Baltimore, MD (US); Isaac Shpantzer, Bethesda, MD (US)

(73) Assignee: CeLight, Inc., Silver Spring, MD (US)

( * ) Notice: Subject to any disclaimer, the term of this patent is extended or adjusted under 35 U.S.C. 154(b) by 165 days.

This patent is subject to a terminal disclaimer.

(21) Appl. No.: 12/389,803

(22) Filed: Feb. 20, 2009

(65) Prior Publication Data

US 2009/0185811 A1    Jul. 23, 2009

Related U.S. Application Data

(63) Continuation-in-part of application No. 11/695,920, filed on Apr. 3, 2007, now Pat. No. 7,715,720, and a continuation-in-part of application No. 10/669,130, filed on Sep. 22, 2003, now Pat. No. 7,327,913, and a continuation-in-part of application No. 11/610,964, filed on Dec. 14, 2006, now Pat. No. 7,397,979, and a continuation-in-part of application No. 11/672,372, filed on Feb. 7, 2007, now Pat. No. 7,483,600, and a continuation-in-part of application No. 12/045,765, filed on Mar. 11, 2008, and a continuation-in-part of application No. 12/137,352, filed on Jun. 11, 2008, and a continuation-in-part of application No. 12/371,249, filed on Feb. 13, 2009.

(60) Provisional application No. 61/090,404, filed on Aug. 20, 2008.

(51) Int. Cl.
*G02B 6/26* (2006.01)
*H04B 10/06* (2006.01)

(52) U.S. Cl. .......... 385/134; 385/15; 398/209; 398/212; 398/214

(58) Field of Classification Search .......... 398/206–210, 398/212–214
See application file for complete search history.

(56) References Cited

U.S. PATENT DOCUMENTS

| 5,245,681 | A | * | 9/1993 | Guignard et al. | 385/16 |
|---|---|---|---|---|---|
| 5,323,258 | A | * | 6/1994 | Tsushima et al. | 398/203 |
| 5,691,832 | A | * | 11/1997 | Liedenbaum et al. | 398/43 |
| 5,946,130 | A | * | 8/1999 | Rice | 359/349 |
| 6,882,781 | B2 | * | 4/2005 | Ionov | 385/48 |
| 7,657,190 | B2 | * | 2/2010 | Akiyama | 398/195 |
| 2003/0090765 | A1 | * | 5/2003 | Neff et al. | 359/172 |
| 2003/0138182 | A1 | * | 7/2003 | Dultz et al. | 385/11 |
| 2007/0047954 | A1 | * | 3/2007 | Mamyshev | 398/33 |
| 2009/0034967 | A1 | * | 2/2009 | Tao et al. | 398/33 |
| 2009/0141333 | A1 | * | 6/2009 | Tsunoda et al. | 359/279 |
| 2009/0279902 | A1 | * | 11/2009 | Granot et al. | 398/208 |

* cited by examiner

*Primary Examiner* — Uyen-Chau N Le
*Assistant Examiner* — Chris H Chu
(74) *Attorney, Agent, or Firm* — Nadya Reingand

(57) ABSTRACT

An optical beam combiner is provided, which allows efficient collection of light for various applications: non-line of sight and free space optical communications, remote sensing, optical imaging and others. A multitude of optical beam portions is captured by a space diversity receiver that includes an optical beam combiner, which has a tree-like topology with interconnected waveguides, electro-optic phase shifters, and directional couplers. For each of the beam portions the phase of the phase shifter and the coupling ratio of coupler in the optical beam combiner are tuned sequentially to maximize the final output power in the final optical waveguide. A portion of the final output beam is used for the power detection and forming a feedback signal for the phases and coupling ratios adjustment. The data or information is recovered from the received final optical beam using coherent detection.

15 Claims, 7 Drawing Sheets

(a)

(b)

(c)

SPACE DIVERSITY OPTICAL RECEIVER AND SYSTEM AND METHOD USING THE SAME

CROSS-REFERENCE TO RELATED APPLICATIONS

This application claims priority of provisional Application Ser. No. 61/090,404 filed Aug. 20, 2008. It is also a continuation-in-part of U.S. patent application Ser. No. 11/695,920 filed Apr. 3, 2007 now U.S. Pat. No. 7,715,720, Ser. No. 10/669,130 filed Sep. 22, 2003 now U.S. Pat. No. 7,327,913, Ser. No. 11/610,964 filed Dec. 14, 2006 now U.S. Pat. No. 7,397,979; Ser. No. 11/672,372 filed Feb. 7, 2007 now U.S. Pat No. 7,483,600; Ser. No. 12/045,765 filed Mar. 11, 2008; Ser. No. 12/137,352 filed Jun. 11, 2008, Ser. No. 12/371,249 filed Feb. 13, 2009, all of which applications are fully incorporated herein by reference.

FIELD OF THE INVENTION

This invention relates generally to laser systems and methods of receiving at least a portion of the laser beam after its transmission through turbulent media such as the atmosphere or underwater. The system includes means for compensation of the optical phase and amplitude distortion as a result of turbulence-induced perturbations in the received beam. The applications comprise free-space optical communications, non-line of sight communications, remote sensing, optical imaging and others.

BACKGROUND OF THE INVENTION

Laser radars, remote sensing, laser communications in free-space atmospheric line-of-sight and non-line-of-sight, as well as in satellite-to-ground and underwater environments are all affected to different degrees by optical turbulence. In this invention we disclose the atmospheric turbulence mitigation approach in view of communication systems; however this approach is applicable for a variety of other arrangements and turbulent media.

The atmospheric turbulence effect on an optical beam, noticeable as beam drift, spread, and scintillation, is the main source of impairments in the free-space optical communications. It leads to the decreased link capacity, bit-error-rate deterioration and sometimes unavailability of the transmission or fading. Adaptive optics schemes are widely used to correct wavefront phase corrupted by turbulence. Adaptive optical systems require direct measurement of the wavefront phase using wavefront sensors such as a Shack-Hartmann sensor or a shearing interferometer, followed by some type of wavefront reconstruction and conjugation. In the presence of the strong phase and intensity fluctuations characteristic of near-earth propagation paths, these types of systems tend to perform poorly. Furthermore, such systems cannot compensate for fast phase change; their operation speed is limited by the hardware response as well as data processing time.

There is a need for an efficient solution on turbulence effects mitigation in optical systems with laser beam propagation through the atmosphere.

SUMMARY OF THE INVENTION

Accordingly, an object of the present invention is to provide an electro-optically adjustable optical beam combining device that can track and compensate for the phase and amplitude distortion across the optical beam caused by the turbulence thereby producing a final single-mode output beam with a maximum optical power. Such an optical device has $2^M$ input waveguides (M is an integer$\geq$1), each receiving a portion of the incoming optical beam. The waveguides are connected by $(2^M-1)$ directional couplers forming a tree-like structure; each coupler is formed by two waveguides, coming in and out of the coupler. In the preferred embodiment, the directional coupler is a two-section coupler with an alternating or reversed $\Delta\beta$. $\Delta\beta$ is the mismatch of the propagation constants of the two coupling waveguides that form the directional coupler. In each coupler one of the two input waveguides has a phase shifter for changing an input phase of the optical beam portion in the same waveguide before its coupling. Furthermore, the power coupling ratio of each ($2^M-1$) directional couplers can be adaptively adjusted in respond to the optical beams in the two input waveguides. The output waveguide forms an input waveguide for a subsequent coupler from $(2^M-1)$ couplers. A final output waveguide from the last coupler is a final output beam of the device. The control means operate to change the phases of the beams propagating in the waveguides before their coupling as well as to change the coupling ratio of the coupler. This change aims to maximize the final output beam power. The control means may include a photodetector receiving a beam in the final output waveguide, producing an electrical signal proportional to the output optical power. The coupling ratio of the coupler as well as the input phase of the optical beam portion in the same waveguide before its coupling is adjusted in a manner that maximizes the output optical power in the final output waveguide. The input phase is changed in a phase shifter connected to the same waveguide before coupling. The coupling ratio is changed in the coupler itself.

The output signal from the device can be detected and used for further processing, information recovery and display. The device may also include an optical receiver to detect the output beam. In the preferred embodiment this signal is received by a coherent optical receiver. In the coherent receiver the signal beam is combined with a local oscillator beam. In one embodiment the receiving beam and the local oscillator beam interfered in a 90° optical hybrid and the output optical signals are processed by balanced photodetectors.

Another object of the present invention is to provide an integrated single monolithic adjustable optical device to perform the beam-combining operation described above. However, the description is provided for any kind of device: an integrated device, a free-space optical link device, and a fiber-optics device. In the preferred embodiment the integrated device is a chip made of $LiNbO_3$ material.

Yet another object of the present invention is to provide a system for information recovery, which can find applications in optical communications, remote sensing, optical imaging and other fields. A transmitter send an information bearing optical beam at an elevated angle. The receiving unit, located aside from the beam propagation direction, includes an optical beam combiner with a set of input waveguides, each receiving a portion of incoming optical beam. $2^M$ inputs of the beam combiner interfere with each other via a system of tunable coupled waveguides. The phases and the coupling ratios in the coupled waveguides of the combiner are adjusted to maximize the resulting output signal from the final output waveguide. The combiner may be used for coherent communication in combination with a balanced 90° optical hybrid. The receiving unit may be located as far as 2000 meters from the transmitter. The transmitter may include a light source that generates multiple wavelengths in the UV, optical or infrared ranges. In one embodiment the light source generates a pulsed or non-pulsed optical signal.

DETAILED DESCRIPTION OF THE PREFERRED EMBODIMENT

The present invention now will be described more fully hereinafter with reference to the accompanying drawings, in which the preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Optical signal transmission in free space is susceptible to atmospheric-induced attenuation and scattering. At the receiver side the beam must be collected and focused on the photodetector. However, the spatial distribution of the optical phase and amplitude is not uniform across the beam caused by turbulence in the atmosphere. As a result, the amount of optical power that can be focused into a small aperture of a photodetector is significantly reduced. The optical power also fluctuates due to the turbulence. This invention provides a solution that mitigates the effect of turbulence of an optical beam in a space-diversity receiver by effectively restoring the spatial uniformity of the beam so that a stable single-mode optical beam with a maximum focused optical power can be obtained. An optical beam combiner is proposed, which allows compensation of the phase and amplitude distortions across the wavefront of the optical beam.

Figure 1:
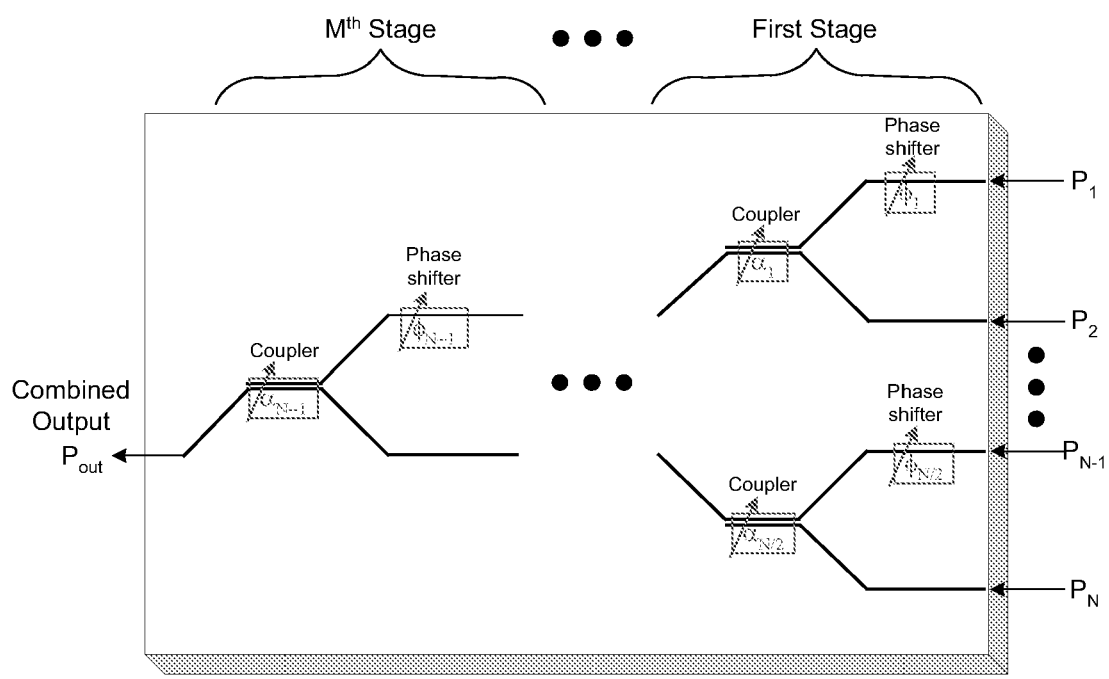
FIG. 1: An M-stage generalized optical beam combiner with N optical inputs from the right and a combined output at the left. There are N−1 directional couplers and phase shifters all interconnected via optical waveguides in a tree structure. The second output branch of the coupler is not shown for clarity.

A compact integrated optical beam combiner with fast response (>MHz) is proposed. The key component to achieve efficient coupling is the optical beam combiner as shown in FIG. 1. The combiner has M stages with $N=2^M$ input optical powers ($P_1, P_2, \ldots, P_N$) from the right and a single final optical output ($P_{out}$) at the left as shown in FIG. 1. The combiner has N−1 directional couplers ($\alpha_1, \alpha_2, \ldots, \alpha_{N-1}$) and phase-shifters ($\phi_1, \phi_2, \ldots, \phi_{N-1}$) interconnected by single-mode optical waveguides in a tree structure. In order to combine efficiently all the input optical beams into a single output beam, the phase of the individual optical beam must be adjusted properly in order to provide constructive interference at the desired output port of the directional coupler with minimal loss of power. The beam combiner performance is quantified by the power-combining efficiency which is defined as the ratio of the combined output power to the sum of the input powers as follows $$\eta = \frac{P_{out}}{P_1 + P_2 + \ldots + P_N} = \frac{P_{out}}{\sum_{i=1}^{N} P_i} = \frac{P_{out}}{P_{max}} \leq 1.$$

The maximum power-combining efficiency is one for an ideal lossless combiner with optimal coupling ratio and phase.

To achieve unity power-combining efficiency, a generalized M-stage optical beam combiner with variable coupling ratio is proposed. In contrast to the phase-only fixed-coupling beam combiner in which all the couplers are fixed to a 50/50 coupling ratio (all α=0.5), the proposed combiner can always achieve unity power-combining efficiency independent of the input power distribution and the number of stages. Theoretical analysis and simulation results of the generalized M-stage optical beam combiner are described next.

Figure 2:
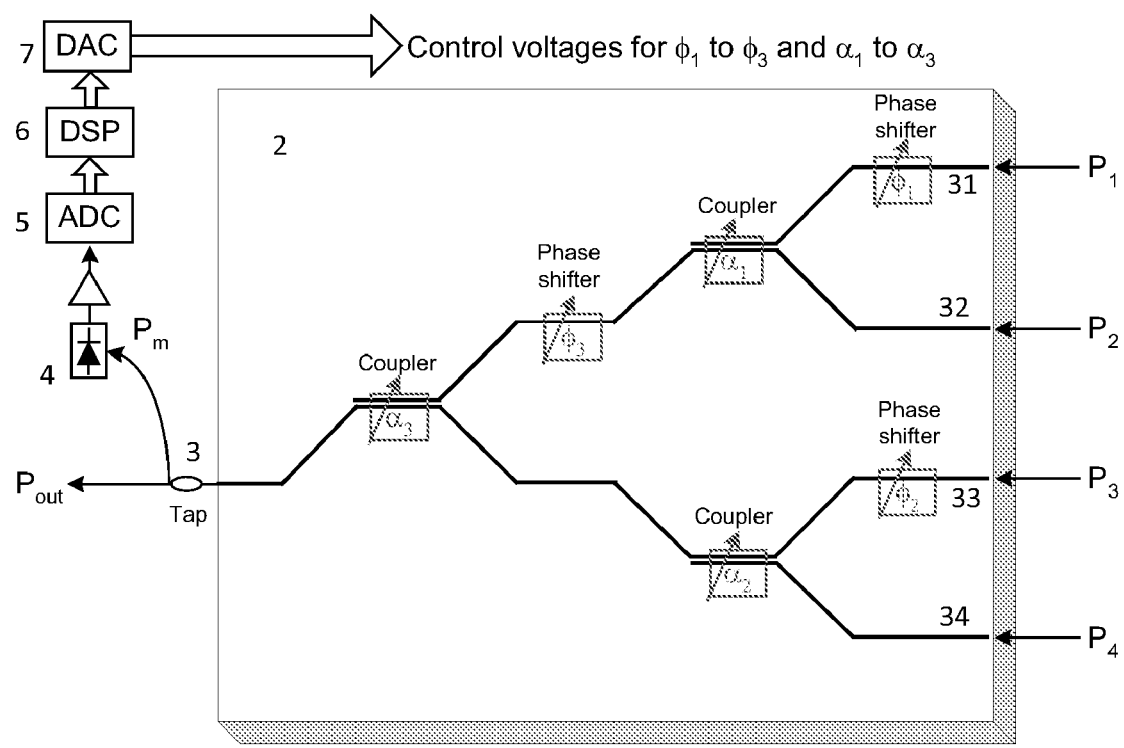
FIG. 2: A two-stage optical beam combiner with a feedback control loop for maximizing the combined output power via adjustment of the phase and the coupling ratio. M=2 or N=4 inputs. The other output branch of the coupler is not shown for clarity.

In the generalized M-stage optical beam combiner, all the directional couplers ($\alpha_1, \alpha_2, \ldots, \alpha_{N-1}$) as well as the phase-shifters ($\phi_1, \phi_2, \ldots, \phi_{N-1}$) are adaptively adjustable according to the combined output power. Optical power is adaptively routed to the correct output port with coupling ratio optimally tuned for every directional couplers of the combiner. Therefore, no optical power is loss in each of the N−1 unit cell (coupler plus phase-shifter) in the M-stage combiner. FIG. 2 shows an example of a two-stage (M=2) generalized beam combiner with the feedback control loop adaptively adjusts the coupling ratio and the phase-shifter to maximize the combined output power, $P_{out}$. Input optical powers ($P_1$ to $P_4$) from the right are directed into the beam combiner. A monitor photodetector 4 at the output on the far left in FIG. 2 detect a portion of the optical power $P_m$ tapped off from the combiner output 3. The photovoltage signal is digitized by a A/D converter 5 and sent to a microprocessor 6 that performs digital signal processing or DSP. Control voltages from the D/A converter output 7 adjust $\phi_1$ and $\alpha_1$ first to maximize $P_m$ followed by adjustment of $\phi_2$ and $\alpha_2$ to maximize $P_m$ for the first stage. At the last stage, control voltages adjust $\phi_3$ and $\alpha_3$ to maximize $P_m$. This sequential phase and coupling adjustment process is repeated and executed continuously to maintain a maximum combined output power. Because of this sequential process where the coupling ratio and phase is adjusted one at a time there is no local maximum of $P_m$ or $P_{out}$. The control loop will always converge to a true global maximum of $P_m$ using the sequential control process. This has been verified by the beam combiner control loop simulation results described later. The control circuit should have a fast response with a bandwidth of at least MHz or much higher than the rate of power and phase fluctuation in each input optical beam. Also, one control cycle (from the input to the output stage) should be performed in a time much less than the turbulence-induced intensity fluctuation time so a small propagation delay is critical. This can be readily achieved in a compact integrated electro-optic beam combining device. The advantage of this approach is that it requires only a single photo-detector. On the other hand, DSP is required and the speed of the control loop is critical.

To understand how the M-stage generalized beam combiner can always achieve unity efficiency, it is sufficient to analyze a one-stage combiner (M=1) or a single unit cell with a phase-shifter followed by a coupler. A theoretical proof is present for a single lossless directional coupler and phase-shifter together as a unit cell with a variable power coupling ratio $\alpha$ between zero and one. The proof shows that unity power-combining efficiency can be achieved for any input optical powers $P_1$ and $P_2$.

Consider a lossless directional coupler with a variable coupling ratio $\alpha$ between zero and one. Assuming the phase-shifter provides the optimal phase such that constructive interference occurs at the output, the output power can be written as $$P_{out} = (1-\alpha)P_1 + \alpha P_2 + 2\sqrt{\alpha(1-\alpha)P_1 P_2} = P_1 + P_2 - [\sqrt{\alpha P_1} - \sqrt{(1-\alpha)P_2}]^2.$$

The power combining efficiency is $$\eta = \frac{P_{out}}{P_1 + P_2} = 1 - \frac{[\sqrt{\alpha P_1} - \sqrt{(1-\alpha)P_2}]^2}{P_1 + P_2}.$$

Taking the derivative of $\eta$ with respect to $\alpha$ gives $$\frac{d\eta}{d\alpha} = \frac{P_2 - P_1}{P_1 + P_2} + \frac{\sqrt{P_1 P_2}}{P_1 + P_2} \frac{1 - 2\alpha}{\sqrt{\alpha(1-\alpha)}}.$$

Setting the derivative to zero gives $$\frac{d\eta}{d\alpha} = 0 \Rightarrow \sqrt{P_1 P_2} \frac{1 - 2\alpha_m}{\sqrt{\alpha_m(1-\alpha_m)}} = P_1 - P_2.$$

Solving for $\alpha_m$ gives $$\alpha_m = \frac{1}{2}\left(1 \pm \sqrt{\frac{d}{d+4}}\right), \quad d = \frac{(P_1 - P_2)^2}{P_1 P_2}.$$

Taking the second derivative of $\eta$ with respect to $\alpha$ gives $$\frac{d^2\eta}{d\alpha^2} = -\left\{\frac{1}{2}\frac{\sqrt{P_1 P_2}}{P_1 + P_2}\frac{4\alpha(1-\alpha) + (1-2\alpha)^2}{\alpha(1-\alpha)\sqrt{\alpha(1-\alpha)}}\right\} < 0.$$

For $0<\alpha<1$, the second derivative of $\eta$ with respect to $\alpha$ is always negative. Therefore, the efficiency is maximum or equal to one when the coupling ratio equals to one of the two possible $\alpha_m$ regardless of what the value of $P_1$ and $P_2$ is. To check if this is indeed the case $\alpha_m$ is substitute back into the equation for $P_{out}$ to obtain $$P_{out} = P_1 + P_2 - \begin{bmatrix} \frac{P_1}{2}\left(1 \pm \sqrt{\frac{d}{d+4}}\right) + \\ \frac{P_2}{2}\left(1 \mp \sqrt{\frac{d}{d+4}}\right) - \\ \sqrt{P_1 P_2\left(1 - \frac{d}{d+4}\right)} \end{bmatrix}.$$

Substituting d into the above and simplify gives $$P_{out} = \frac{1}{2}\frac{1}{P_1 + P_2}\begin{bmatrix}(P_1 + P_2)^2 + \\ (\mp P_1 \pm P_2)|P_1 - P_2| + \\ 4P_1 P_2\end{bmatrix}.$$

Therefore, the efficiency is $$\eta = \frac{P_{out}}{P_1 + P_2} = \frac{1}{2}\frac{1}{(P_1 + P_2)^2}\begin{bmatrix}(P_1 + P_2)^2 + \\ (\mp P_1 \pm P_2)|P_1 - P_2| + \\ 4P_1 P_2\end{bmatrix}.$$

There are two possible values of $\eta$ according to which sign of the above equation are selected. Let us consider these two cases separately. For the first case, the efficiency can be written as $$\eta = \frac{1}{2}\frac{1}{(P_1 + P_2)^2}\begin{bmatrix}(P_1 + P_2)^2 + \\ (-P_1 + P_2)^2|P_1 - P_2| + \\ 4P_1 P_2\end{bmatrix}$$

$$= \frac{1}{2}\frac{1}{(P_1 + P_2)^2}\begin{bmatrix}(P_1 + P_2)^2 - \\ (P_1 + P_2)^2 + \\ 8P_1 P_2\end{bmatrix}$$

$$= \frac{4P_1 P_2}{(P_1 + P_2)^2} \leq 1.$$

For the second case, one obtain for $\eta$ $$\eta = \frac{1}{2}\frac{1}{(P_1 + P_2)^2}\begin{bmatrix}(P_1 + P_2)^2 + \\ (P_1 + P_2)|P_1 - P_2| + \\ 4P_1 P_2\end{bmatrix}$$

-continued $$= \frac{1}{2} \frac{1}{(P_1+P_2)^2} \left[ \frac{(P_1+P_2)^2 +}{(P_1+P_2)^2} \right] = 1.$$

Figure 3:
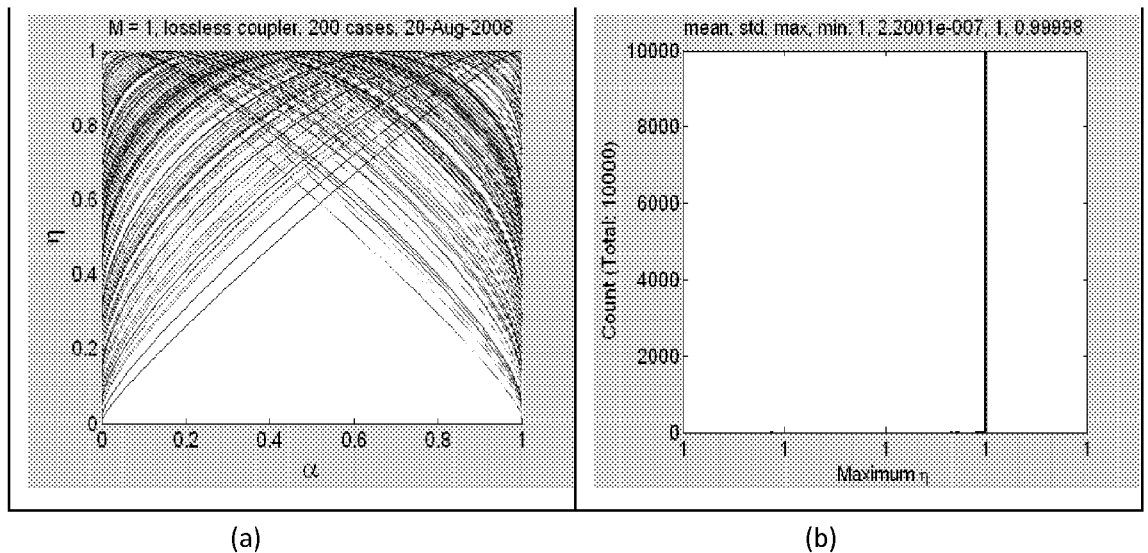
FIG. 3: (a) Power combining efficiency η versus coupling ratio α for 200 cases of random distribution of the two input powers. M=1; (b) histogram of maximum η for 10000 cases of randomly distributed $P_1$ and $P_2$. The statistics for maximum η are shown on the top of the histogram.

Therefore, the second case gives unity efficiency independent of the input optical powers. One can conclude that there is always a coupling ratio that gives unity combining efficiency regardless of the two input powers. This implies that unity efficiency can be achieved with an M-stage beam combiner independent of the input power distribution. FIG. 3(a) shows $\eta$ versus $\alpha$ for 200 cases of randomly distributed $P_1$ and $P_2$. The maximum $\eta$ in every one of these cases are one. FIG. 3(b) shows a histogram of the maximum $\eta$ for 10000 cases of random $P_1$ and $P_2$. Unity efficiency is obtained for all 10000 cases when $\alpha$ is optimal.

In order for the generalized beam combiner to produce unity efficiency the coupling ratios of all the directional couplers must be continuously adjustable from zero to one in respond to the input power distributions. In other words, each directional coupler in the combiner must be capable to produce at least one complete power transfer or switching cycle (bar to cross state or vice versa) from one output port of the coupler to the other in respond to external control signal. However, depending on the design of the dual-channel directional coupler the range of coupling ratio may be restricted subject to fabrication imperfections in practical devices.

The two-section alternating or reversed $\Delta\beta$ directional coupler (first proposed by H. Kogelnik and R. V. Schmidt, "Switched directional couplers with alternating $\Delta\beta$," *IEEE J. Quantum. Electron.*, vol. QE-12, no. 7, p. 396, July 1976.) provides the best performance with the flexibility and tolerant to fabrication errors comparing to other devices such as a one-section coupler. The dual-channel coupler is consists of two coupling sections each with a length of L/2 (total length: L). The transfer matrix for a two-section alternating-$\Delta\beta$ directional coupler is given by:

$$M_2 = \begin{bmatrix} A_2 & -jB_2 \\ -jB_2^* & A_2^* \end{bmatrix}.$$

The matrix components are given by $$A_2 = A_1 A_1^* - B_1^2 = 1 - 2B_1^2,$$

$$B_2 = 2A_1^* B_1,$$

where $$A_1 = \cos\left[\sqrt{(\kappa L/2)^2 + (\delta L/2)^2}\right] + j\frac{\delta L}{2}\operatorname{sinc}\left[\sqrt{(\kappa L/2)^2 + (\delta L/2)^2}\right],$$

$$B_1 = \frac{\kappa L}{2}\operatorname{sinc}\left[\sqrt{(\kappa L/2)^2 + (\delta L/2)^2}\right].$$

Figure 4:
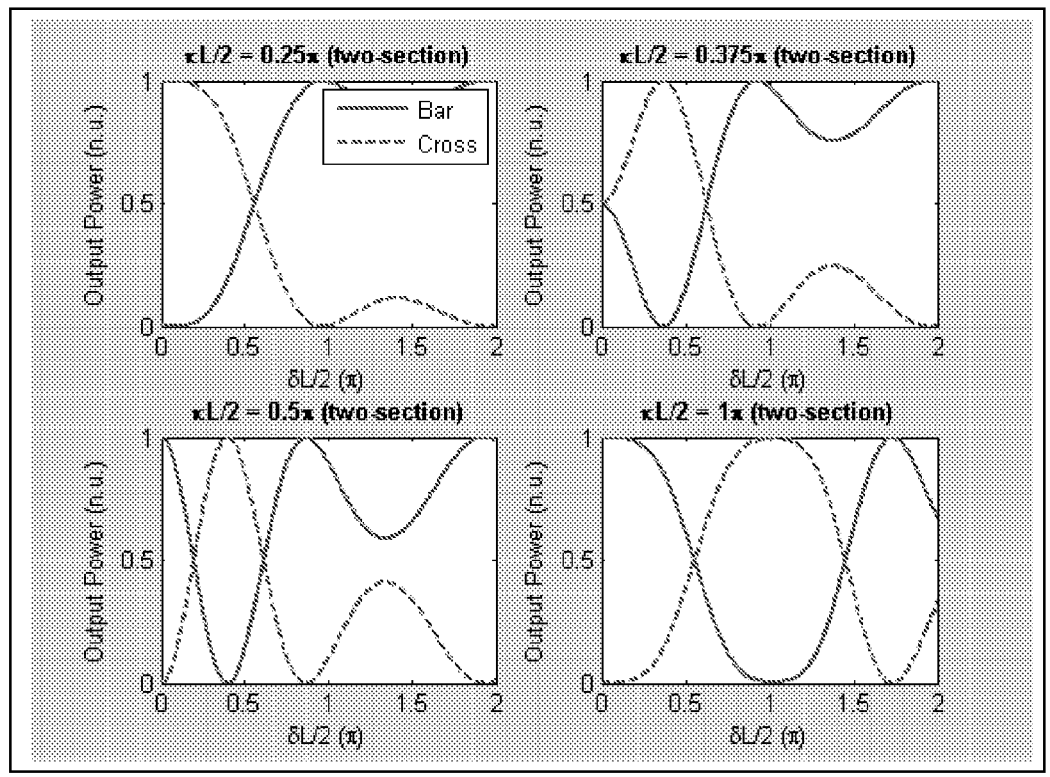
FIG. 4: Normalized output power of a two-section alternating-Δβ directional coupler versus δL/2 for κL/2 of 0.25π, 0.375π, 0.5π, and π. Only one optical input is used to excite the coupler in this case.

Note that $|A_2|^2 + |B_2|^2 = 1$ as a result of power conservation. FIG. 4 shows plots of the output power versus $\delta L/2$ for $\kappa L/2$ of $0.25\pi$, $0.375\pi$, $0.5\pi$, and $\pi$. Only one optical input is applied to the coupler. All four values of $\kappa L/2$ provide at least one complete switching cycle or power transfer from one waveguide to the other (bar to cross state or vice versa). However, $\kappa L/2 = 0.5\pi$ is the best choice since it requires the lowest range of $\delta L/2$ and thus lowest voltage ($\delta L = \pi V/V_\pi$) required to achieve one complete power switching cycle. In general, it is not desirable to use $\kappa L/2 > 0.5\pi$ because longer coupling length means increase waveguide loss.

Figure 5:
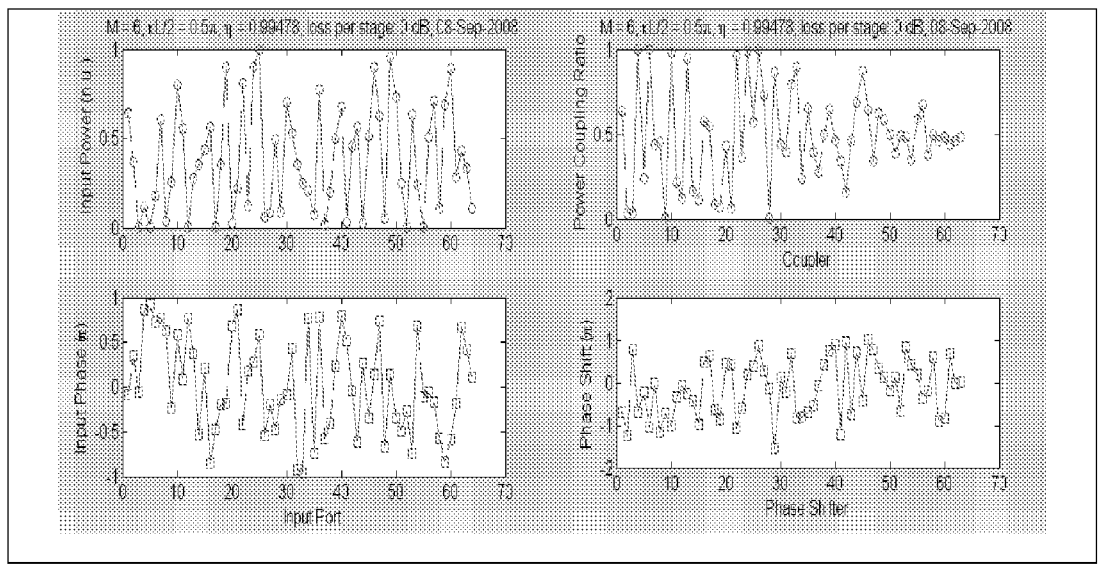
FIG. 5: Simulation of a six-stage beam combiner. Left: 64 random input optical powers (top) and random input optical phases (bottom). Right: optimal power coupling ratios (top) and phase shifts (bottom) of all 63 couplers and phase-shifters after 400 iteration of the control loop. Random input optical field amplitudes and phases were used. η is shown on the top of the plot. κL/2=0.5π. All couplers are two-section with alternating Δβ.

FIG. 5 shows the distribution of the 64 input random optical powers and random phases for M=6 (N=64) used in the simulation of a six-stage beam combiner control. All couplers are two-section with alternating $\Delta\beta$. The optimal power coupling ratios and phase shifts for maximum efficiency of all 63 couplers and phase-shifters after 400 iteration of the control loop are also shown. Note in FIG. 5 that the optimal coupling ratio varies randomly across the first 33 couplers consistent with the random distribution of the input optical beams. The optimal coupling ratio, however, converges to 0.5 for the last 30 couplers. This is because as the optical power approaches closer to the combiner output the distribution of the optical powers becomes more uniform implying an optimal coupling ratio converging to the optimal value of 0.5.

Figure 6:
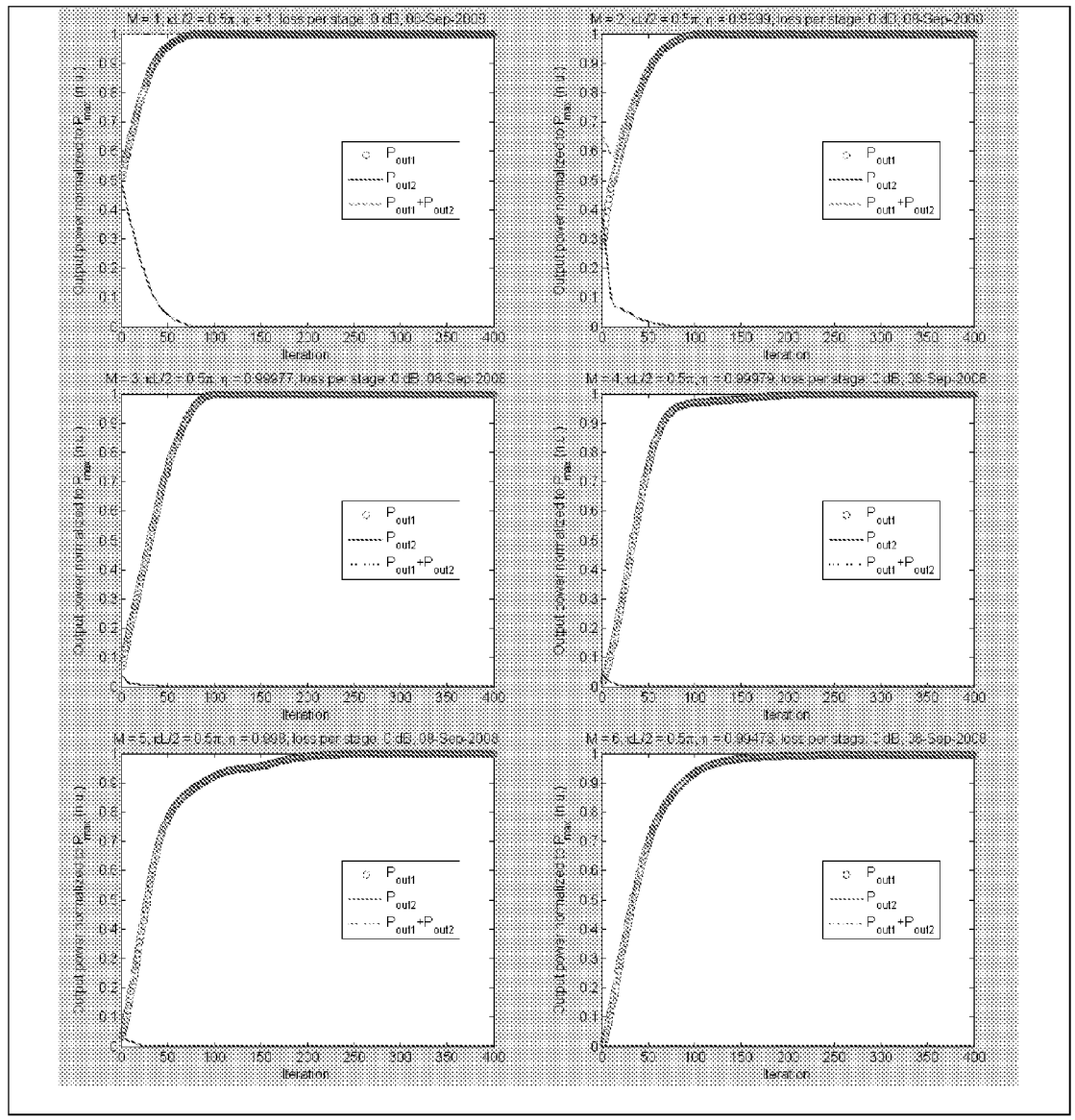
FIG. 6: Normalized combined output power versus number of iteration of the control loop for M=1 to 6. Random input optical field amplitude and phases were used. η is shown on the top of the plot. κL/2=0.5π. All couplers are two-section with alternating Δβ.

FIG. 6 shows typical simulation results of the beam combiner control loop for M=1 to 6 (N=2 to 64) for $\kappa L/2$ equals $0.5\pi$ with alternating-$\Delta\beta$ couplers. The combined output power, $P_{out1}$, and the complementary output power, $P_{out2}$, at the two output branches of the combiner as well as the sum, $P_{out1}+P_{out2}$, are shown versus the number of iteration. All powers shown are normalized to the sum of all input powers or $P_{max}$. Random uniform distribution of input optical field amplitudes and phases were used. For all cases, the combined output power $P_{out1}$ converges to the maximum possible output power $P_{max}$ achieving unity combining efficiency in less than 200 iterations while the complementary output power $P_{out2}$ reduces to zero as expected. These results validate the operation and performance of the beam combiner.

The above simulation results show that implementation of the beam combiner using the two-section coupler with alternating or reversed $\Delta\beta$ provides the optimal performance.

The material for fabricating the integrated optical beam combiner include but not limited to lithium niobate, silicon, III-V semiconductors such as InP, InGaAs, and GaAs for infrared wavelength range. For UV/violet range, semiconductor passive waveguide with low absorption in this wavelength range can be utilized with materials such as SiC, GaN, and $Al_xGa_{1-x}N$ alloys. Organic materials such as polymer can also be employed.

The integrated beam combiner consists of many directional couplers and phase shifters interconnected with waveguides. Because of this curved waveguides are necessary for interconnections. Conventional dielectric curved waveguides suffer significant attenuation due to scattering and radiation losses if the radius of curvature of the curved waveguide is too small. Moderate to large bend radius is needed to keep the bend-induced optical losses to a minimum. In fact, the radius of curvature must well exceed the optical wavelength to avoid large losses at the bends. As a result, waveguide elements such as couplers and phase shifters of the beam combiner can be separated quite far apart. This significantly increases the device size especially with large-scale integration. Moreover, large waveguide bend radius requires longer waveguide length to accommodate the gradual bend which increases optical loss due to intrinsic material absorption. Optical loss of the beam combiner decreases the power-combining efficiency and therefore reduces its performance and effectiveness.

To overcome the bend-induced loss limitation, novel guided-wave approach for the beam combiner is provided. One approach is based on nanophotonics: 2-D photonic-crystal waveguides (PCW) with linear defects and photonic wires in a photonics band-gap material such as those described in R. D. Meade et al., "Novel applications of photonic band gap materials: low-loss bends and high Q cavities," *J. Appl. Phys.*, vol. 75, p. 4753, 1994, and in the U.S. Pat. No. 5,682,401 by J. Joannopoulos et al. It has been shown that this type of photonic band-gap structure can tolerate very tight bends with minimal or zero losses, see, for example, A. Mekis et al., "High transmission through sharp bends in photonics crystal waveguides," *Phys. Rev. Letts.*, vol. 77, p. 3787, 1996. In fact, it has been shown theoretically that curved PCWs can achieve complete transmission (lossless) at certain optical frequencies, and very high transmission (>95%) over wide frequency ranges. Moreover, low optical loss can be achieved even for 90° bends with zero radius of curvature, with a maximum transmission of 98% as opposed to 30% at most for analogous conventional dielectric waveguides. Therefore, bend-induced optical losses can be significantly reduced (from −5.2 to −0.088 dB, for example) with the PCWs. As a result, more couplers and phase shifters can be densely packed on a single substrate reducing the overall size of the beam combiner. The nanophotonic waveguides can be fabricated, for example, on silicon-on-insulator with standard CMOS technology as described in W. Bogaerts et al., "Nanophotonic waveguides in silicon-on-insulator fabricated with CMOS technology," *J. Lightwave Technol.*, vol. 23, p. 401, 2005.

Figure 7:
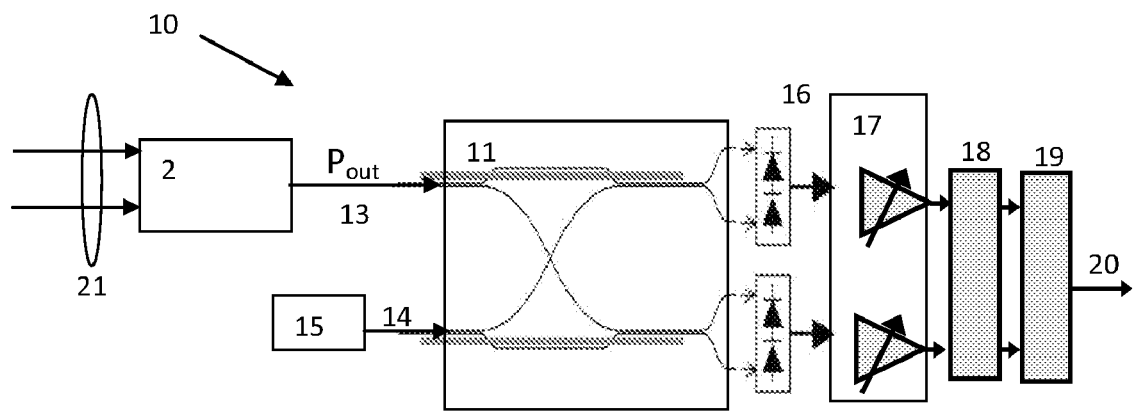
FIG. 7: The preferred embodiment of the integrated receiver.

In the preferred embodiment the combiner is a part of a coherent optical receiver with a 90° optical hybrid as shown in FIG. 7. A 90° optical hybrid is described in the U.S. patent application Ser. No. 11/695,920 filed by the same team of inventors.

An optical receiver 10 of FIG. 7 consists of three main elements: the beam combiner 2, the optical 90° hybrid 11 and a detector unit 16; it serves as the signal receiving and coherent detection. The beam combiner 2 provides a maximum output optical power $P_{out}$ into the output 13 as described above. The output signal $P_{out}$ is mixed with a local oscillator signal 14 from a local oscillator light source 15 in a 90° optical hybrid 11 followed by a set of detectors 16. In the preferred embodiment balanced detectors are used. After the signal amplification in the transimpedance amplifiers 17, they are converted into digital signals in a A/D converter 18 followed by a digital signal processing unit (DSP) 19. The output signal 20 can be used for further processing, data recovery and display.

In the preferred embodiment the beam combiner 2 is preceded by the interface optical unit 21 (FIG. 7), which may include focusing lenses and a bundle of optical fibers. In one embodiment, the focusing optics can be cylindrical. In another embodiment, optical unit 21 can be focusing micro-optics arrays. Examples of the micro-optics array include but not limited to fiber collimator arrays available from MEMS Optical, Inc., Huntsville, Ala. or microlens arrays fabricated by Heptagon USA, Inc., San Jose, Calif.

It is beneficial to have phase shifters in both the upper and lower branches of the combiner, for example, in waveguides 31 and 32, 33 and 34, etc. in FIG. 2. In this case a push-pull operation with a equal but opposite sign phase shifts in the upper and lower waveguides can be used. However, in principle, the similar phase shift can be achieved by implementing only one phase-shifter in one of the two branches.

Figure 8:
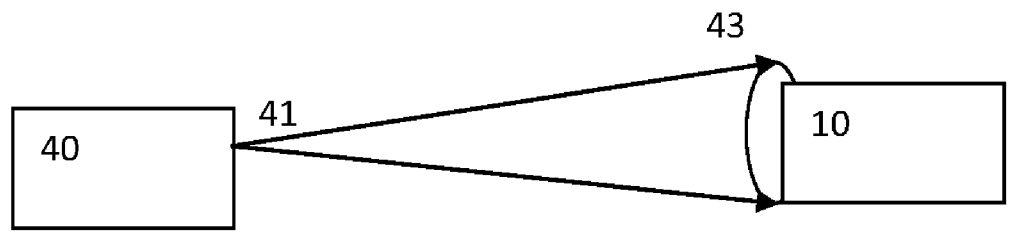
FIG. 8: Optical systems that benefit from using the beam combiner of the present invention: (a) line-of-sight and (b) non-line-of-sight optical communications, (c) systems with reflected/scattered optical beam, such as imaging systems, remote sensing, etc.
Figure 8:
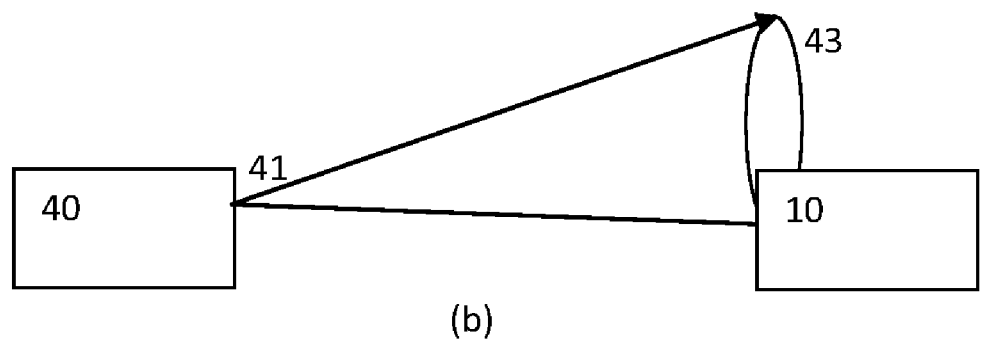
Figure 8:
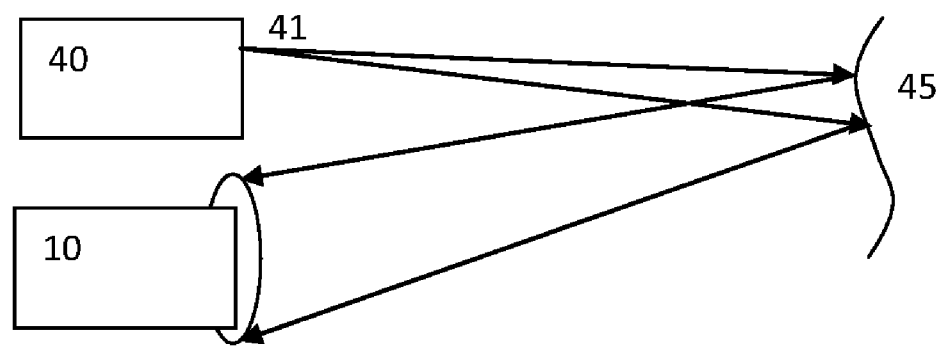

The disclosed beam combiner can be implemented in a variety of optical systems (FIGS. 8(*a-c*)). In one embodiment it is a part of a line-of-sight free-space communication system as shown in FIG. 8(*a*). In FIG. 8(*a*) a transmitter 40 sends an encoded laser beam 41 towards a receiver 10. In the preferred embodiment the light source of the transmitter is a pulsed or non-pulsed light source. The beam 41 is scattered on multiple inhomogeneities along the optical path forming a cone of light 43. A receiver 10 includes a beam combiner of the present invention, an optical 90° hybrid and a feedback control circuit to control the phase shifters and couplers of the combiner followed by DSP unit to recover the transmitted data. The transmitter and receiver may be from 1 to 2000 meters apart.

Another embodiment of the communication system is shown in FIG. 8(*b*), where the beam combiner of the present invention is used in case of non-line-of-sight transmission.

In yet another embodiment the combiner is used in a system with light reflected or scattered from the surface 45 as shown in FIG. 8(*c*). Such systems are used, for example, for optical imaging, for remote sensing and other applications.

In the preferred embodiment the data in the communication system is transmitted using a phase-shift-keying modulation, preferably QPSK. In yet another embodiment the transmission is performed using orthogonal frequency division multiplexed communications as disclosed in co-pending patent application of the same inventive entity application Ser. No. 12/045,765 filed Mar. 11, 2008 and Ser. No. 12/137,352 filed Jun. 11, 2008.

Data transmission in such system can be performed using a light source generating radiation in multiple wavelengths in UV, visible or infrared range.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An optical device for an optical beam receiving, comprising:
    $2^M$ input waveguides, where M is an integer $\geq 1$, receiving portions of the optical beam; the waveguides forming a matrix;
    $(2^M-1)$ directional couplers; each coupler is formed by two waveguides, coming in and out of the coupler;
    a first output waveguide from each coupler forming an input waveguide for a subsequent optical coupler from $(2^M-1)$ couplers;
    a final output waveguide from the last coupler forming a final output beam of the device; and wherein a portion of the final output beam is used in control means changing input phases in at least one input waveguide of each coupler to maximize the final output beam power, wherein the control means include a photodetector receiving a beam in the final output waveguide, producing an electrical signal being used to change the coupling ratio of each coupler, wherein the coupling ratio change leads to maximization of the final output beam power received by the photodetector.

2. The device of claim 1, wherein the control means include a photodetector receiving the portion of the final beam, producing an electrical signal being used to change the input phases in at least one input waveguide of each coupler.

3. The device of claim 2, wherein the input phase is changed in a phase shifter connected to the same waveguide before coupling.

4. The device of claim 1, wherein the matrix is a linear array.

5. The device of claim 1, wherein the device is selected from at least one of, an integrated device, a free-space optical link device, and a fiber optics device.

6. The device of claim 1, wherein at least one coupler is a two-section coupler with an alternating or reversed $\Delta\beta$, wherein $\Delta\beta$ is a mismatch of propagation constants of the two coupling waveguides forming the directional coupler.

7. The device of claim 1, further comprising: a coherent optical receiver to detect the output beam for receiving photon-starved signal.

8. The device of claim 7, further comprising:
a local oscillator, and wherein the receiver is based on a 90-degrees optical hybrid;
the hybrid receiving and mixing the output beam of the device and a local oscillator beam, providing four hybrid output beams; and the hybrid output beams being used to recover information from the optical beam.

9. The device of claim 1 being used in an optical communications system, laser radar or chemical sensing system.

10. An non-line-of-sight optical communication system, comprising:
a transmitter sending an information bearing light beam through the atmosphere at an elevated angle;
a receiving unit located aside from the beam propagation direction, the unit receiving a light scattered on atmospheric inhomogeneities along the beam propagation and changed a direction of the propagation due to the scattering; the receiving unit including a device for the receiving beam, comprising $2^M$ input waveguides, where M is an integer $\geq 1$, receiving portions of the optical beam; the waveguides forming a matrix; $(2^M-1)$ directional couplers; each coupler is formed by two waveguides, coming in and out of the coupler;
a first output waveguide forming an input waveguide for a subsequent coupler from $(2^M-1)$ directional couplers; a final output waveguide from the last coupler forming a final output beam of the device; and wherein a portion of the final output beam is used in control means changing input phases in at least one input waveguide of each coupler to maximize the final output beam power, wherein the control means include a photodetector receiving the portion of the final output beam, producing an electrical signal being used to change the input phase of the optical beam in each waveguide before its coupling, the input phase is changed in a phase shifter connected to the same waveguide before coupling and wherein the control means include a photodetector receiving a beam in the final output waveguide, producing an electrical signal being used to change the coupling ratio of each directional coupler, wherein the coupling ratio change leads to maximization of the final output beam power received by the photodetector.

11. The system of claim 10, wherein the receiving unit is positioned at least 1-2000 meters from the transmitter.

12. The system of claim 10, wherein the light source generates a spectrum of wavelengths in the ultraviolet, optical or infrared ranges.

13. A method of non-line-of-sight data transmission, comprising:
sending an information bearing light beam through the atmosphere at an elevated angle; the light beam scattered on atmospheric inhomogeneities and changed a direction of its propagation;
receiving portions of the scattered light by an optical combiner, comprising $2^M$ input waveguides, where M is an integer $\geq 1$; the input waveguides forming a matrix;
coupling each pair of adjacent waveguides; each directional coupler is formed by two waveguides, coming in and out of the coupler; in each coupler the output of a first output waveguide forming an input waveguide for a subsequent coupler from $(2^M-1)$ couplers; an output waveguide from the last coupler forming a final output beam of the device;
detecting the final output beam and recovering the transmitted information; and
wherein a portion of the final output beam is used in control means changing input phases in at least one input waveguide for each coupler to maximize the final output beam power; and
wherein the control means changing the coupling ratios of the couplers to maximize the final output beam power.

14. The method of claim 13, further comprising:
detecting the output beam using a coherent receiver allowing recovery of photon-starved signal.

15. The method of claim 14, wherein the coherent receiver is based on 90-degrees optical hybrid.

* * * * *